US010999093B2

(12) United States Patent
Wang et al.

(10) Patent No.: US 10,999,093 B2
(45) Date of Patent: May 4, 2021

(54) NB-IOT BASED WIRELESS DEVICE GROUP ACCESS METHOD AND TERMINAL

(71) Applicant: XI'AN ZHONGXING NEW SOFTWARE CO. LTD., Shaanxi (CN)

(72) Inventors: Gezhuang Wang, Shaanxi (CN); Zonghe Yue, Shaanxi (CN)

(73) Assignee: XI'AN ZHONGXING NEW SOFTWARE CO. LTD., Shaanxi (CN)

(*) Notice: Subject to any disclaimer, the term of this patent is extended or adjusted under 35 U.S.C. 154(b) by 0 days.

(21) Appl. No.: 16/632,845

(22) PCT Filed: Oct. 16, 2017

(86) PCT No.: PCT/CN2017/106366
§ 371 (c)(1),
(2) Date: Jan. 21, 2020

(87) PCT Pub. No.: WO2019/015145
PCT Pub. Date: Jan. 24, 2019

(65) Prior Publication Data
US 2020/0153651 A1 May 14, 2020

(30) Foreign Application Priority Data
Jul. 21, 2017 (CN) .......................... 201710602811.2

(51) Int. Cl.
H04L 12/28 (2006.01)
H04W 4/70 (2018.01)
(Continued)

(52) U.S. Cl.
CPC .......... H04L 12/2836 (2013.01); H04W 4/70 (2018.02); H04W 4/80 (2018.02); H04W 76/11 (2018.02); H04L 2012/2841 (2013.01)

(58) Field of Classification Search
CPC ............................. H04L 12/2836; H04W 4/80
See application file for complete search history.

(56) References Cited

U.S. PATENT DOCUMENTS

2016/0014154 A1* 1/2016 Huang .............. H04W 12/0808
726/1

FOREIGN PATENT DOCUMENTS

CN 105610904 A 5/2016
CN 106341393 A 1/2017
(Continued)

OTHER PUBLICATIONS

International Search Report for Application No. PCT/CN2017/106366, dated Dec. 27, 2017, 4 pages.

Primary Examiner — Daniell L Negron
(74) Attorney, Agent, or Firm — Morgan, Lewis & Bockius LLP

(57) ABSTRACT

An NB-IOT based wireless device group access method and terminal relate to the technology of smart home systems. The method includes that the NB-IOT based device group access terminal establishes (S601) a connection with an external device requesting to access an NB-IOT network; and when a command issued by the NB-IOT network to the external device is received, the NB-IOT based device group access terminal interprets (S602) the command into a communication command protocol supported by the external device and issues the communication command protocol supported by the external device to the corresponding external device; when information uploaded by the external device with the established connection is received, the NB-IOT based device group access terminal interprets (S602) the information into a communication command protocol supported by the NB-IOT network and uploads the communication command protocol supported by the NB-IOT network to the NB-IOT network.

15 Claims, 4 Drawing Sheets

(51) Int. Cl.
   *H04W 4/80*     (2018.01)
   *H04W 76/11*    (2018.01)

(56) References Cited

FOREIGN PATENT DOCUMENTS

| CN | 106549836 A | 3/2017 |
| CN | 106549863 A | 3/2017 |

* cited by examiner

NB-IOT BASED WIRELESS DEVICE GROUP ACCESS METHOD AND TERMINAL

CROSS REFERENCE TO RELATED APPLICATIONS

This application is a National Stage Application, filed under 35 U.S.C. 371, of International Patent Application No. PCT/CN2017/106366, filed on Oct. 16, 2017, which claims priority to Chinese patent application No. 201710602811.2, filed on Jul. 21, 2017, contents of both of which are incorporated herein by reference in their entireties.

TECHNICAL FIELD

The present disclosure relates to, but is not limited to, smart home technologies, and in particular, to an NB-IOT based wireless device group access method and terminal.

BACKGROUND

A smart home system is composed of a sensor, a server and a private cloud. The sensor and the server communicate through short-range communication modes such as Zigbee, Wi-Fi and Bluetooth. After network connection is completed between the sensor and the server (namely the sensor accesses a server management network), the server synchronizes information of the sensor and information of the server to the private cloud, and then a user downloads a corresponding APP management software, registers and performs query and setting of a smart home device through the cloud service.

SUMMARY

The following is a summary of the subject matter described herein in detail. This summary is not intended to limit the scope of the claims.

A narrow band internet of things (NB-IOT) based wireless device group access method and terminal are provided herein.

Provided is a cellular NB-IOT based device group access method, which includes the steps described below.

The NB-IOT based device group access terminal establishes a connection with an external device requesting to access an NB-IOT network.

When the NB-IOT based device group access terminal has received a command issued by the NB-IOT network to the external device, the command is interpreted into a communication command protocol supported by the external device and issued to the corresponding external device. When the NB-IOT based device group access terminal has received information uploaded by the external device with the established connection, the information is interpreted into a communication command protocol supported by the NB-IOT network and uploaded to the NB-IOT network.

In an embodiment, in the method, the step in which the NB-IOT based device group access terminal establishes the connection with the external device requesting to access the NB-IOT network includes the step described below.

When the NB-IOT based device group access terminal has received a request initiated by the external device for accessing the NB-IOT network, the NB-IOT based device group access terminal is connected to the external device, an independent NB-IOT access identifier (ID) is allocated to the connected external device, and then the external device is caused to access the NB-IOT network through the NB-IOT access ID of the external device.

In an embodiment, after the NB-IOT based device group access terminal allocates the independent NB-IOT access ID to the connected external device, the method further includes the step described below.

The NB-IOT based device group access terminal stores a device mapping. The device mapping includes a correspondence among an ID of the external device accessing the NB-IOT network, the NB-IOT access ID of the external device and the communication command protocol supported by the external device.

In an embodiment, in the method, the step in which when the NB-IOT based device group access terminal has received the information uploaded by the external device with the established connection, the information is interpreted into the communication command protocol supported by the NB-IOT network includes the step described below.

The NB-IOT based device group access terminal queries the communication command protocol supported by the external device from the device mapping according to a unique ID of the external device, parses the information uploaded by the external device according to the communication command protocol supported by the external device, and interprets a parsing result into the communication command protocol supported by the NB-IOT network.

In an embodiment, in the method, the external device includes a smart home device.

In an embodiment, in the method, the connection between the NB-IOT based device group access terminal and the external device is established in any one or more of the following modes: Bluetooth, Wi-Fi or Zigbee.

Further provided is a cellular NB-IOT based device group access terminal, which includes an NB-IOT access module, a device management module and a data service module which are connected in turn.

The device management module is configured to establish a connection with the external device requesting to access the NB-IOT network.

The data service module is configured to, when the NB-IOT access module has received a command issued by the NB-IOT network to the external device, interpret the command into a communication command protocol supported by the external device and issue the interpreted command to the corresponding external device through the NB-IOT access module; and when the device management module has received information uploaded by the external device with the established connection, interpret the information into a communication command protocol supported by the NB-IOT network, and upload the interpreted information to the NB-IOT network through the NB-IOT access module.

In an embodiment, in the terminal, the device management module is configured to, when receiving a request initiated by the external device to access the NB-IOT network, connect to the external device and allocate an independent NB-IOT access ID to the connected external device.

The NB-IOT access module is configured to cause the external device to access the NB-IOT network through the NB-IOT access ID of the external device.

In an embodiment, in the terminal, the device management module is further configured to store a device mapping after allocating the independent NB-IOT access ID to the connected external device. The device mapping includes a correspondence among an ID of the external device accessing the NB-IOT network, an NB-IOT access ID of the external device, and a communication command protocol supported by the external device.

In an embodiment, in the terminal, the data service module is configured to, when the device management module has received information uploaded by the external device with the established connection, interpret the information into a communication command protocol supported by the NB-IOT network through the mode described below.

A communication command protocol supported by the external device is queried from the device mapping according to a unique ID of the external device, the information uploaded by the external device is parsed according to the communication command protocol supported by the external device, and a parsing result is interpreted into a communication command protocol supported by the NB-IOT network.

In an embodiment, in the method, the external device includes a smart home device.

In an embodiment, in the terminal, the device management module includes one or more of a Bluetooth module, a Wi-Fi module, and a Zigbee module.

According to the solution of the present application, IOT terminal devices supporting different smart home network protocols are connected to the NB-IOT network through the interpretation and conversion of the smart access device, so that the situation where a plurality of smart home networks establish their respective free clouds and cannot interact with each other is avoided. Moreover, the NB-JOT smart access terminal according to the present application enables a large number of JOT terminal devices without NB-JOT chips to access the NB-IOT network of an operator, thereby avoiding the costs for upgrading and replacing the devices and having significant economic benefits.

Other aspects can be understood after the drawings and the detailed description are read and understood.

DETAILED DESCRIPTION

If each smart home system is equipped with a private cloud service and a private cloud protocol, then the protocols of different manufacturers are not uniform, the systems cannot be interconnected, and the operation and research and development costs are high.

Narrow band internet of things (NB-IOT) allows a large number of IOT terminal devices to access the operator network. Each of the IOT terminal devices includes smart household appliances and sensors, accesses a network in a Wi-Fi, Zigbee or Bluetooth mode, and is not provided with an NB-IOT chip. The smart household appliances cannot access the operator network, thereby wasting devices. If upgrading is performed, the upgrading and replacement of a large number of devices is not low in costs.

Figure 1:
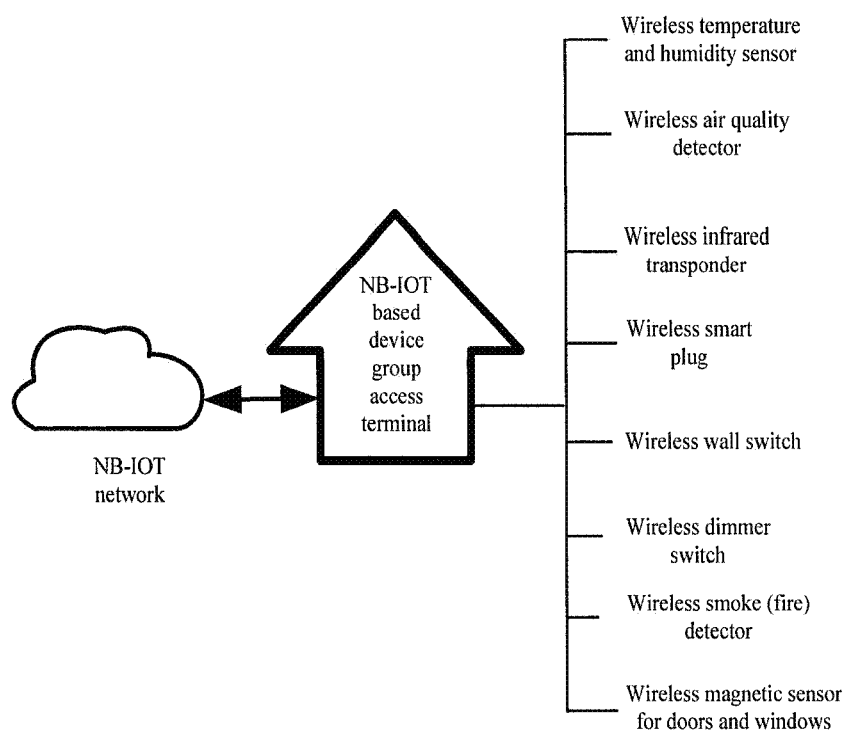
FIG. 1 is a schematic diagram illustrating a topology of smart home devices accessing an NB-JOT network through an access terminal according to an embodiment of the present disclosure.

The present application provides an NB-IOT based device group access terminal. That is, the smart home device can access the access terminal through a Wi-Fi, Bluetooth or Zigbee network. Through interpretation and proxy functions of the access terminal, a connected smart device accesses an NB-IOT network. The connected smart device may also be referred to as an external device. The external device may be a smart sensor or an alarm in a smart home device, e.g., a wireless temperature and humidity sensor, a wireless air quality detector, a wireless infrared transponder, a wireless smart plug, a wireless wall switch, a wireless dimmer switch, a wireless smoke (fire) detector and a wireless magnetic sensor for doors and windows. The network topology of these sensors and the NB-IOT based device group access terminal is shown in FIG. 1.

The present application further provides an NB-IOT based device group access terminal. The terminal includes an NB-IOT access module, a device management module and a data service module connected in turn.

The NB-IOT access module is configured to be in charge of connection and data transmission between an external device and an NB-IOT network.

The device management module may include one or more of a Bluetooth module, a Wi-Fi module and a Zigbee module and is configured to be in charge of connection with and management of the external device accessing the NB-IOT network. The Bluetooth module, the Wi-Fi module and the Zigbee module are in charge of short-range wireless communication with the external device.

The data service module is configured to be in charge of an interpretation function of an NB-IOT network protocol and a smart home interaction protocol. For example, when the NB-IOT access module receives a command issued by the NB-IOT network to the external device, the command is interpreted into a communication command protocol supported by the external device and issued to the corresponding external device through the NB-IOT access module; and when the device management module receives information uploaded by the external device with the established connection, the information is interpreted into a communication command protocol supported by the NB-IOT network and uploaded to the NB-IOT network through the NB-IOT access module.

Figure 6:
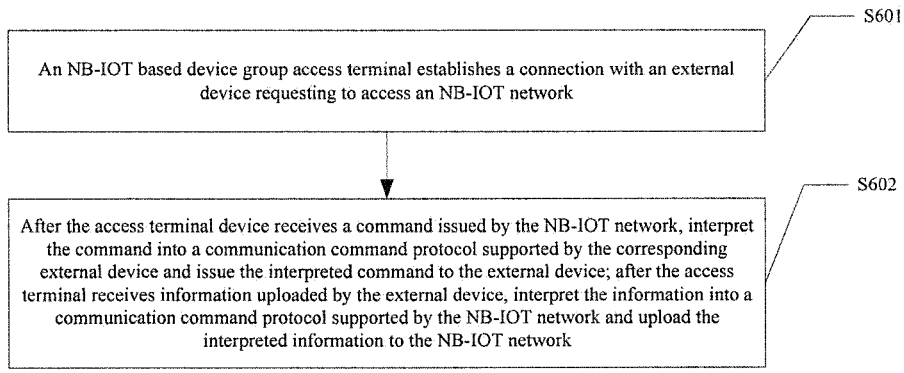
FIG. 6 is a flowchart of an NB-JOT based wireless device group access method according to an embodiment of the present disclosure.

The present application further provides an NB-IOT based wireless device group access method. As shown in FIG. 6, the NB-IOT based wireless device group access method may be performed using the above-mentioned access device, and the method includes the steps described below.

In a first step S601, the NB-IOT based device group access terminal establishes a connection with an external device requesting to access an NB-IOT network.

The NB-IOT based device group access terminal may accept the external device (for example, a smart sensor) selected by a user to access the NB-IOT network.

In addition, before the first step, when the user uses the system for the first time, the NB-IOT based device group access terminal also needs to automatically start the network connection preparation of the device and device search after being started. The external devices involved in the present application may include a plurality of smart sensors and alarms in smart home devices.

In a second step S602, when the access terminal device receives a command issued by the NB-IOT network, the command is interpreted into a communication command protocol supported by the corresponding external device (for example, a sensor) and issued to the corresponding external device. When the access terminal receives information uploaded by the external device, the information is interpreted into a communication command protocol supported by the NB-IOT network and uploaded to the NB-IOT network.

It should be noted that, the operation in which the NB-LOT based device group access terminal establishes a connection with the external device requesting to access the NB-IOT network includes the steps described below. When the NB-IOT based device group access terminal receives a request initiated by the external device for accessing the NB-IOT network, the NB-IOT based device group access terminal is connected to the external device, an independent NB-IOT access ID is allocated to the connected external device, and then the external device is caused to access the NB-IOT network through the NB-IOT access ID of the external device.

According to the above-mentioned operation, the NB-IOT based device group access terminal may also store a device mapping. That is, a correspondence among the ID of the external device accessing the NB-IOT network, the NB-IOT access ID of the external device and the communication command protocol supported by the external device.

Based on the device mapping, the NB-IOT based device group access terminal can query the communication command protocol supported by the external device according to a unique ID of the external device, parse the information uploaded by the external device according to the queried communication command protocol, and interpret the parsing result into the communication command protocol supported by the NB-IOT network.

The following is a detailed description of the implementation of the above scheme in combination with the drawings and practical applications.

Figure 2:
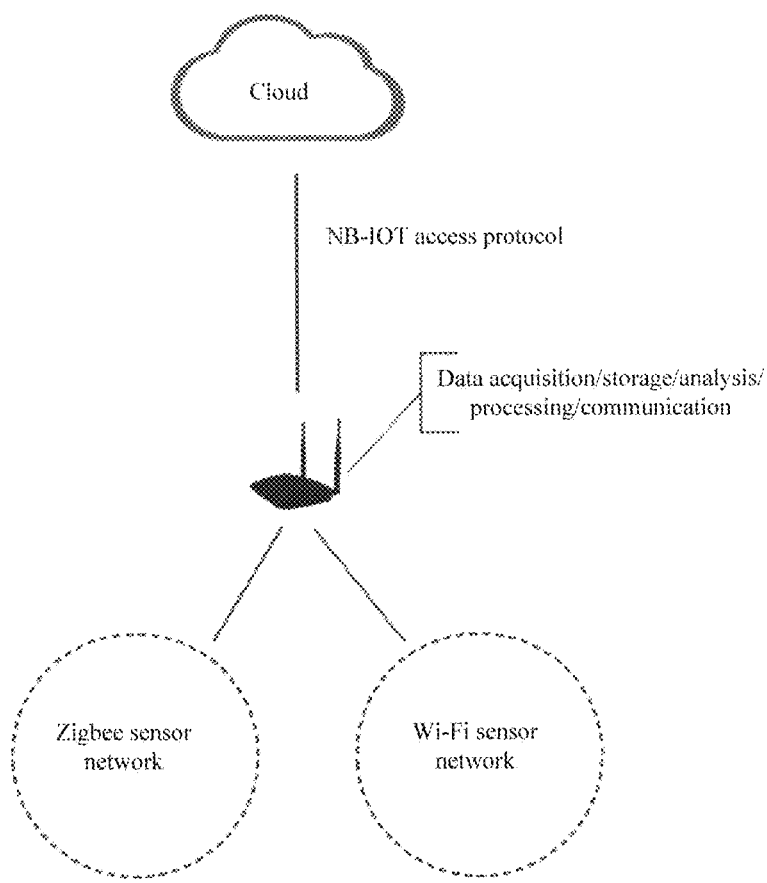
FIG. 2 is a schematic diagram illustrating the principle of an access terminal according to an embodiment of the present disclosure.

Embodiments of the present disclosure provide an NB-IOT smart access terminal. The principle of the terminal is shown in FIG. 2.

According to embodiments of the present disclosure, the NB-IOT smart access terminal interacts with the NB-IOT network through an NB-IOT communication protocol, and the NB-IOT smart access terminal establishes a connection with one or more external devices (for example, sensors, alarms) through a Zigbee sensor network, a Wi-Fi sensor network or a Bluetooth network. The NB-IOT smart access terminal is in charge of allocating an independent identifiable ID for accessing the NB-IOT network to the one or more external devices (that is, sensors and alarms), so that the sensors and alarms can be connected from a relatively independent smart home network to the NB-IOT network of the operator based on the ID, and the management and operation capabilities of the existing NB-IOT network can be obtained.

Figure 3:
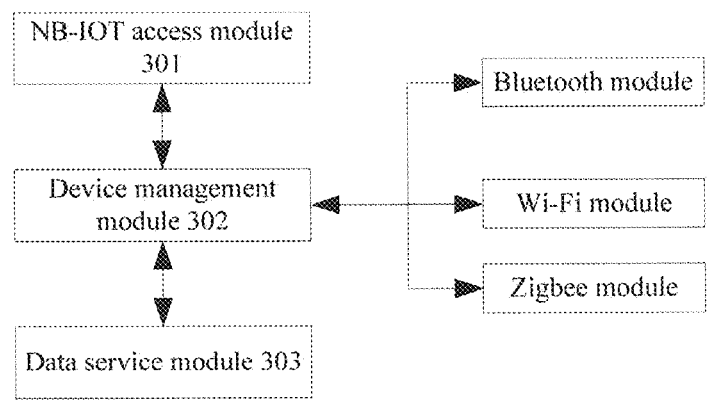
FIG. 3 is a schematic diagram illustrating a structure of an access terminal according to an embodiment of the present disclosure.

In an embodiment, the structure of the NB-IOT based wireless device group access terminal is shown in FIG. 3. The structure of the NB-IOT based wireless device group access terminal includes an NB-IOT access module 301, a device management module 302 and a data service module 303.

The NB-IOT access module 301 is configured to be in charge of connection and data transmission between one or more external devices and the NB-IOT network.

The device management module 302 is configured to be in charge of an access management function of the external device. The device management module 302 may include one or more of a Bluetooth module, a Wi-Fi module and a Zigbee module for short-range wireless communication with the one or more external devices.

The data service module 303 is configured to be in charge of a interpretation function of an NB-IOT network protocol and a smart home interaction protocol.

The NB-IOT network sends IOT data to applications. Cellular internet of things (CIoT) defines two optimization schemes in evolved packet system (EPS): user plane CIoT EPS optimization and control plane CIoT EPS optimization. For the, uplink data is transmitted from eNB (CIoT RAN) to mobility management entity (MME). A transmission path is divided into two branches: either transmission form a serving gateway (SGW) to a PDN gateway (PGW) and then to an application server, or connection through a service capability exposure function (SCEF) to the application server (CIoT Services). The latter supports only non-IP data transmission. A downlink data transmission path is the same, but with an opposite direction. The scheme does not need to establish a data wireless bearer, and a data packet is directly sent on a signaling wireless bearer. Therefore, the scheme is suitable for infrequent transmission of small data packets. The SCEF is specially designed for the NB-IOT and newly introduced. The SCEF is used to transmit non-IP data packets on the control plane and provides an abstract interface for network services such as authentication. For the user plane CIoT EPS optimization, a data transmission mode of the internet of things is to send data on the wireless bearer, from the SGW to the PGW and then to the application server. Therefore, the scheme will incur extra overhead when a connection is established, but its advantage is that the packet sequence is transmitted faster. The scheme supports transmission of IP data and non-IP data. According to the characteristic of the NB-IOT network, the smart access terminal needs to decompose the interactive data between the sensor and the server into control commands and data commands, and upload the control commands and data commands to the NB-IOT network through different transmission modes. In this way, even if the wireless bearing of data is abnormal, a control instruction of the sensor can still be sent to the NB-IOT network by signaling, and the sensor information with a small amount of data can also be packaged in control signaling and sent to the NB-IOT network on the control plane.

Figure 4:
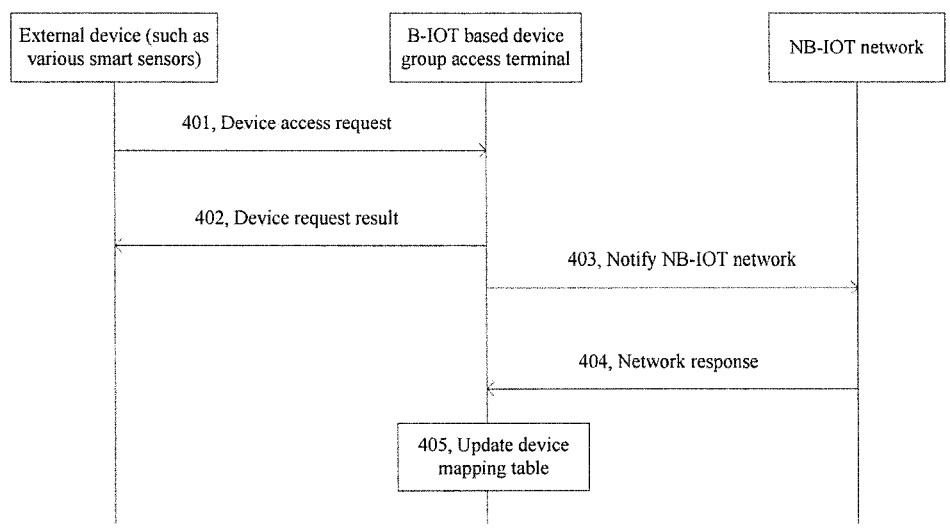
FIG. 4 is a flowchart of a method for a sensor to access an NB-JOT network according to an embodiment of the present disclosure.

Based on the above-mentioned characteristic of the NB-IOT network, the following is an example to illustrate how the external device (for example, a sensor) is connected to the NB-IOT network in the preceding scheme. The access process is shown in FIG. 4 and includes the steps described below.

In step 401, the external device (for example, a smart sensor) sends a device access request to the NB-IOT based device group access terminal, and the NB-IOT device group access terminal sends the device access request back to the external device after receiving the device access request.

A communication path between the external device (for example, a smart sensor) and the NB-IOT based device group access terminal is Wi-Fi, Zigbee or Bluetooth, and an adopted protocol is a smart home access protocol.

In step 402, the NB-IOT based device group access terminal parses a unique ID of the external device according to the smart home access protocol, and checks whether there is an available and unallocated NB-IOT access ID. If there is an unallocated access ID, the terminal allocates the NB-IOT access ID to the external device and uses the NB-IOT access ID as an ID of the external device in the NB-IOT network, and adds a device mapping (that is, the unique ID of the external device and the NB-IOT access ID of the corresponding external device) to a device mapping table of the terminal.

In step 403, the NB-IOT based device group access terminal assembles the NB-IOT access ID of the external device into a control plane device access message and synchronizes the message to the NB-IOT network.

In step 404, the NB-IOT network returns a response for the access message. After the access succeeds, the external device may serve as a common NB-IOT terminal and access the NB-IOT network.

In step 405, the NB-IOT based device group access terminal updates the device mapping table and sets the status of the external device to a status of being connected to the NB-IOT network.

At this point, the NB-IOT based device group access terminal may notify that the process for the external device to access the NB-IOT network is completed.

The definition of the device mapping table involved in embodiments of the present disclosure is shown in the following Tables 1 and 2. The access status and protocol information of the external device may be maintained through the device mapping table.

Table 1 is a device mapping table.

| Item | Unique ID of the device | Hardware description of the device | Network access protocol of the device | Internal smart home protocol |
|---|---|---|---|---|
| Description | Serial code for identifying the device | Manufacturer information of the device | Internal-network access mode (Bluetooth, Wi-Fi, Zigbee) | Internal protocol (Zigbee HA, Haier U+) |

Table 2 is a continuation of Table 1

| Item | NB-IOT access ID | Internal-net connection status | Internal-net connection time | NB-IOT network connection status | NB-IOT network connection time |
|---|---|---|---|---|---|
| Description | NB-IOT network ID | Device access status (connected, off-line) | Access time | Device access status in the NB-IOT network (connected, off-line) | Access time |

Figure 5:
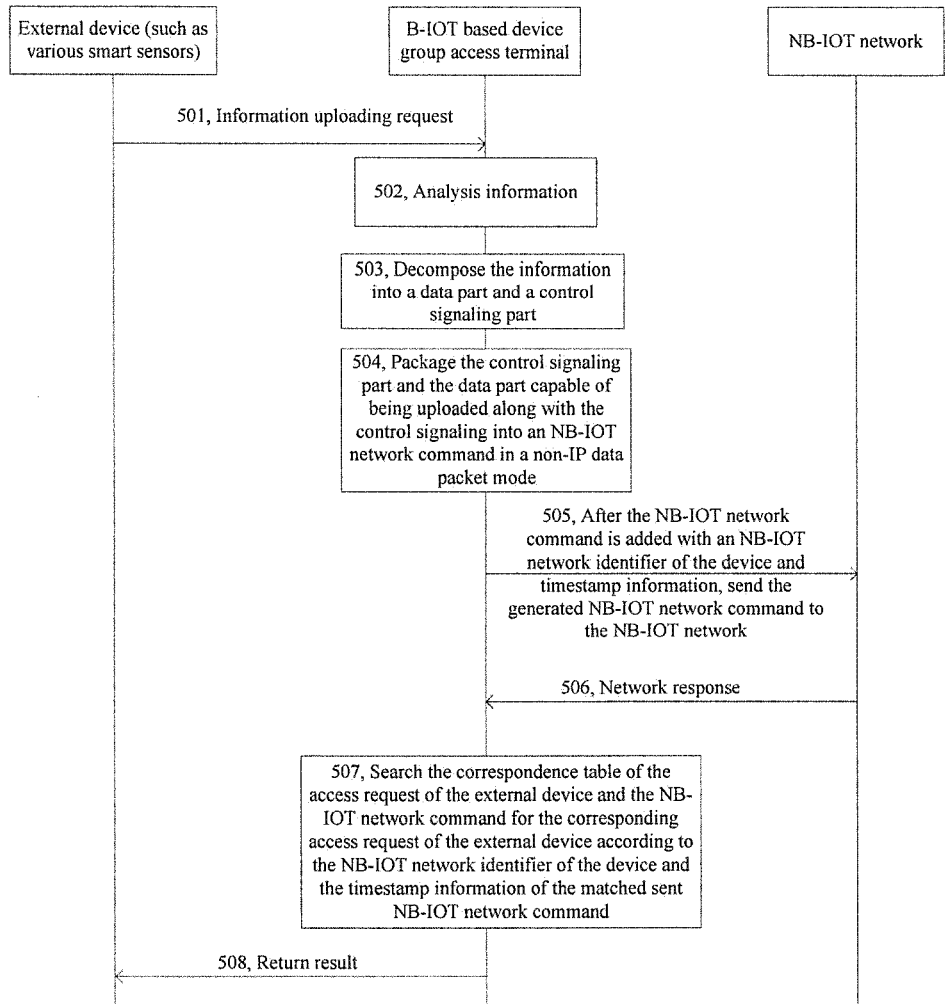
FIG. 5 is a flowchart of a method for a sensor to upload information to an NB-JOT network according to an embodiment of the present disclosure.

The following is an example illustrating the process of uploading information to the NB-IOT network by an external device in embodiments of the present disclosure. Referring to FIG. 5, the process includes steps 501 to 508.

In step 501, an external device (for example, a sensor) sends a device information uploading request to an NB-IOT based device group access terminal. After receiving the request, the NB-IOT based device group access terminal checks the NB-IOT network connection status of the external device in the device mapping table. If the NB-IOT network connection status of the external device is the status of being connected to the NB-IOT network, step 502 is performed. If the NB-IOT network connection status of the external device is the status of being not connected to the NB-IOT network, a network connection request is sent to the NB-IOT network again. If the network connection fails, the status update failure result is returned to the external device. If the network connection succeeds, the device mapping table is updated, and step 502 is performed.

In step 502, the uploading request is parsed according to a corresponding internal smart home communication protocol item of the external device in the device mapping table.

In step 503, the NB-IOT based device group access terminal decomposes the information into a data part and a control signaling part. The data part is decomposed, according to a data length threshold, into a data part (including device status updating information and alarm information) with a shorter data length and capable of being uploaded along with the control signaling and a data part (including a detailed data part) which needs to be sent separately.

In step 504, the control signaling part and the data part capable of being uploaded along with the control signaling are packaged into an NB-IOT network command in a non-IP data packet mode, and the data part which needs to be sent separately is packaged into an NB-IOT network command in an IP data packet mode.

In step 505, after the NB-IOT network command is added with an NB-IOT network identifier of the device and timestamp information, the generated NB-IOT network command is sent to the NB-IOT network, and a correspondence between an access request of the external device and the NB-LOT network command is stored in a sending buffer queue of the NB-IOT based device group access terminal.

In this step, the specific content of the correspondence table of the access request of the external device and the NB-IOT network command is shown in Table 3.

In step 506, after receiving the command response sent by the NB-IOT network, the NB-IOT based device group access terminal matches the sent NB-IOT network command in the sending buffer queue; if the corresponding sent command is not matched in the sending buffer queue, the command response is discarded; if the corresponding sent command is matched in the sending buffer queue, step 507 is performed.

In step 507, the correspondence table of the access request of the external device and the NB-IOT network command is searched for the corresponding access request of the external device according to the NB-IOT network identifier of the device and the timestamp information of the matched sent NB-IOT network command.

In step 508, a return result is generated according to the internal smart home protocol corresponding to the access request of the external device and sent to the corresponding external device.

The correspondence between the access request of the external device and the NB-IOT network command in embodiments of the present disclosure is shown in Tables 3 and 4.

Table 3 is a table of the correspondence between the access request of the external device and the NB-IOT network command.

| Item | Unique ID of the device | Network access protocol of the device | Internal smart home protocol | Type of internal uploading request |
|---|---|---|---|---|
| Description | Serial code for identifying the device | Internal-net access mode (Bluetooth, Wi-Fi, Zigbee) | Internal protocol (Zigbee HA, Haier U+) | Defined uploading request type in the internal smart home protocol |

Table 4 is a continuation of Table 3.

| Item | Time of internal uploading request | NB-IOT access ID | NB-IOT network connection status | Type of internal uploading request | Type of NB-IOT network command |
|---|---|---|---|---|---|
| Description | Timestamp of the received uploading request | NB-IOT network ID | Device access status in the NB-IOT network | Defined uploading request type in the internal smart home protocol | Type of generated NB-IOT network command |

A computer-readable storage medium further provided by embodiments of the present disclosure is configured to store computer-executable instructions which, when executed by a processor, cause the processor to perform the above-mentioned methods.

It can be seen from the above-mentioned embodiments that, in the present application, a device with an NB-IOT chip (that is, an NB-IOT based device group access terminal) is added to a group, and other external devices (that is, home smart devices) are connected to the device through a wireless mode (Wi-Fi, Zigbee or Bluetooth). The access terminal provides a function of switching a communication path between NB-IOT network communication and access modes such as Wi-Fi, Zigbee and Bluetooth, provides a command interpretation between the NB-IOT network command and a private smart home access protocol, and can implement coverage of various smart home protocols and devices through extension, thereby achieving an effect that all devices access the NB-IOT network.

It should be understood by those skilled in the art that function modules/units in all or part of the steps of the method, the system and the device disclosed above may be implemented as software, firmware, hardware and appropriate combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other media used for storing desired information and accessed by a computer. In addition, as is known to those skilled in the art, the communication medium generally includes the computer-readable instructions, the data structures, the program modules, or other data in modulated data signals such as carriers or other transmission mechanisms, and may include any information issue medium.

The above are only embodiments of the present disclosure and are not intended to limit the scope of the present disclosure. Any modifications, equivalent substitutions, improvements and the like made within the spirit and principle of the present disclosure are within the scope of the present disclosure.

In the present application, IOT terminal devices supporting different smart home network protocols are connected to the NB-IOT network through the interpretation and conversion of the smart access device, so that the situation where smart home networks establish their respective free clouds and cannot interact with each other is avoided. Moreover, the NB-IOT smart access terminal according to the present application enables a large number of IOT terminal devices without NB-IOT chips can access the NB-IOT network of an operator, thereby avoiding the costs for upgrading and replacing the devices and having significant economic benefits.

What is claimed is:

1. A narrow band internet of things (NB-IOT) based device group access method, comprising:
   establishing, by an NB-IOT based device group access terminal, a connection with an external device requesting to access an NB-IOT network; and
   in response to determining that the NB-IOT based device group access terminal has received a command issued by the NB-IOT network to the external device, interpreting the command into a communication command protocol supported by the external device and issuing the interpreted command to the external device corresponding to the command;
   in response to determining that the NB-IOT based device group access terminal has received information uploaded by the external device with the established connection, interpreting the information into a communication command protocol supported by the NB-IOT network and uploading the interpreted information to the NB-IOT network;
   wherein establishing, by the NB-IOT based device group access terminal, the connection with the external device requesting to access the NB-IOT network comprises:
      in response to determining that the NB-IOT based device group access terminal has received a request initiated by the external device to access the NB-IOT network, connecting to the external device, allocating an independent NB-IOT access identifier (ID) to the connected external device, and causing the external device to access the NB-IOT network through the NB-IOT access ID of the external device.

2. The method of claim 1, further comprising:
   after allocating, by the NB-IOT based device group access terminal, the independent NB-IOT access ID to the connected external device, storing, by the NB-IOT based device group access terminal, a device mapping, wherein the device mapping comprises a correspondence among an ID of the external device accessing the NB-IOT network, the NB-IOT access ID of the external device and the communication command protocol supported by the external device.

3. The method of claim 2, wherein in response to determining that the NB-IOT based device group access terminal has received the information uploaded by the external device with the established connection, interpreting the information into the communication command protocol supported by the NB-IOT network comprises:
   querying, by the NB-IOT based device group access terminal, the communication command protocol supported by the external device from the device mapping according to a unique ID of the external device, parsing the information uploaded by the external device according to the communication command protocol supported by the external device, and interpreting a parsing result into the communication command protocol supported by the NB-IOT network.

4. The method of claim 1, wherein the external device comprises a smart home device.

5. The method of claim 4, wherein the connection between the NB-IOT based device group access terminal and the external device is established in one or more of following modes:
   Bluetooth, Wi-Fi or Zigbee.

6. A narrow band internet of things (NB-IOT) based device group access terminal, comprising:
   a processor; and
   a memory for storing instructions executable by the processor,
   wherein when executing the instructions, the processor is configured to:
      establish a connection with an external device requesting to access an NB-IOT network;
      in response to receiving a command issued by the NB-IOT network to the external device, interpret the command into a communication command protocol supported by the external device and issue the interpreted command to the external device corresponding to the command; and in response to receiving information uploaded by the external device with the established connection, interpret the information into a communication command protocol supported by the NB-IOT network and upload the interpreted information to the NB-IOT network;
   wherein the processor is further configured to:
      in response to receiving a request initiated by the external device to access the NB-IOT network, connect to the external device and allocate an independent NB-IOT access identifier (ID) to the connected external device; and
      cause the external device to access the NB-IOT network through the NB-IOT access ID of the external device.

7. The terminal of claim 6, wherein the processor is further configured to:
   store a device mapping after allocating the independent NB-IOT access ID to the connected external device, wherein the device mapping comprises a correspondence among an ID of the external device accessing the NB-IOT network, the NB-IOT access ID of the external device and the communication command protocol supported by the external device.

8. The terminal of claim 7, wherein the processor is configured to, in response to receiving the information uploaded by the external device with the established connection, interpret the information into the communication command protocol supported by the NB-IOT network in a manner of:
   querying the communication command protocol supported by the external device from the device mapping according to a unique ID of the external device, parsing the information uploaded by the external device according to the communication command protocol supported by the external device, and interpreting a parsing result into the communication command protocol supported by the NB-IOT network.

9. The terminal of claim 6, wherein the external device comprises a smart home device.

10. The terminal of claim 9, wherein the connection between the NB-IOT based device group access terminal and the external device is established in one or more of following modes:
a Bluetooth module, a Wi-Fi module or a Zigbee module.

11. A nonvolatile computer-readable storage medium, which stores computer-executable instructions which, when executed by a processor, cause the processor to perform a narrow band internet of things (NB-IOT) based device group access method, wherein the method comprises:
establishing, by an NB-IOT based device group access terminal, a connection with an external device requesting to access an NB-IOT network; and
in response to determining that the NB-IOT based device group access terminal has received a command issued by the NB-IOT network to the external device, interpreting the command into a communication command protocol supported by the external device and issuing the interpreted command to the external device corresponding to the command; in response to determining that the NB-IOT based device group access terminal has received information uploaded by the external device with the established connection, interpreting the information into a communication command protocol supported by the NB-IOT network and uploading the interpreted information to the NB-IOT network;
wherein establishing, by the NB-IOT based device group access terminal, the connection with the external device requesting to access the NB-IOT network comprises:
in response to determining that the NB-IOT based device group access terminal has received a request initiated by the external device to access the NB-IOT network, connecting to the external device, allocating an independent NB-IOT access identifier (ID) to the connected external device, and causing the external device to access the NB-IOT network through the NB-IOT access ID of the external device.

12. The storage medium of claim 11, further comprising:
after allocating, by the NB-IOT based device group access terminal, the independent NB-IOT access ID to the connected external device, storing, by the NB-IOT based device group access terminal, a device mapping, wherein the device mapping comprises a correspondence among an ID of the external device accessing the NB-IOT network, the NB-IOT access ID of the external device and the communication command protocol supported by the external device.

13. The storage medium of claim 12, wherein in response to determining that the NB-IOT based device group access terminal has received the information uploaded by the external device with the established connection, interpreting the information into the communication command protocol supported by the NB-IOT network comprises:
querying, by the NB-IOT based device group access terminal, the communication command protocol supported by the external device from the device mapping according to a unique ID of the external device, parsing the information uploaded by the external device according to the communication command protocol supported by the external device, and interpreting a parsing result into the communication command protocol supported by the NB-IOT network.

14. The storage medium of claim 11, wherein the external device comprises a smart home device.

15. The storage medium of claim 14, wherein the connection between the NB-IOT based device group access terminal and the external device is established in one or more of following modes:
Bluetooth, Wi-Fi or Zigbee.

* * * * *